Patented Mar. 27, 1934

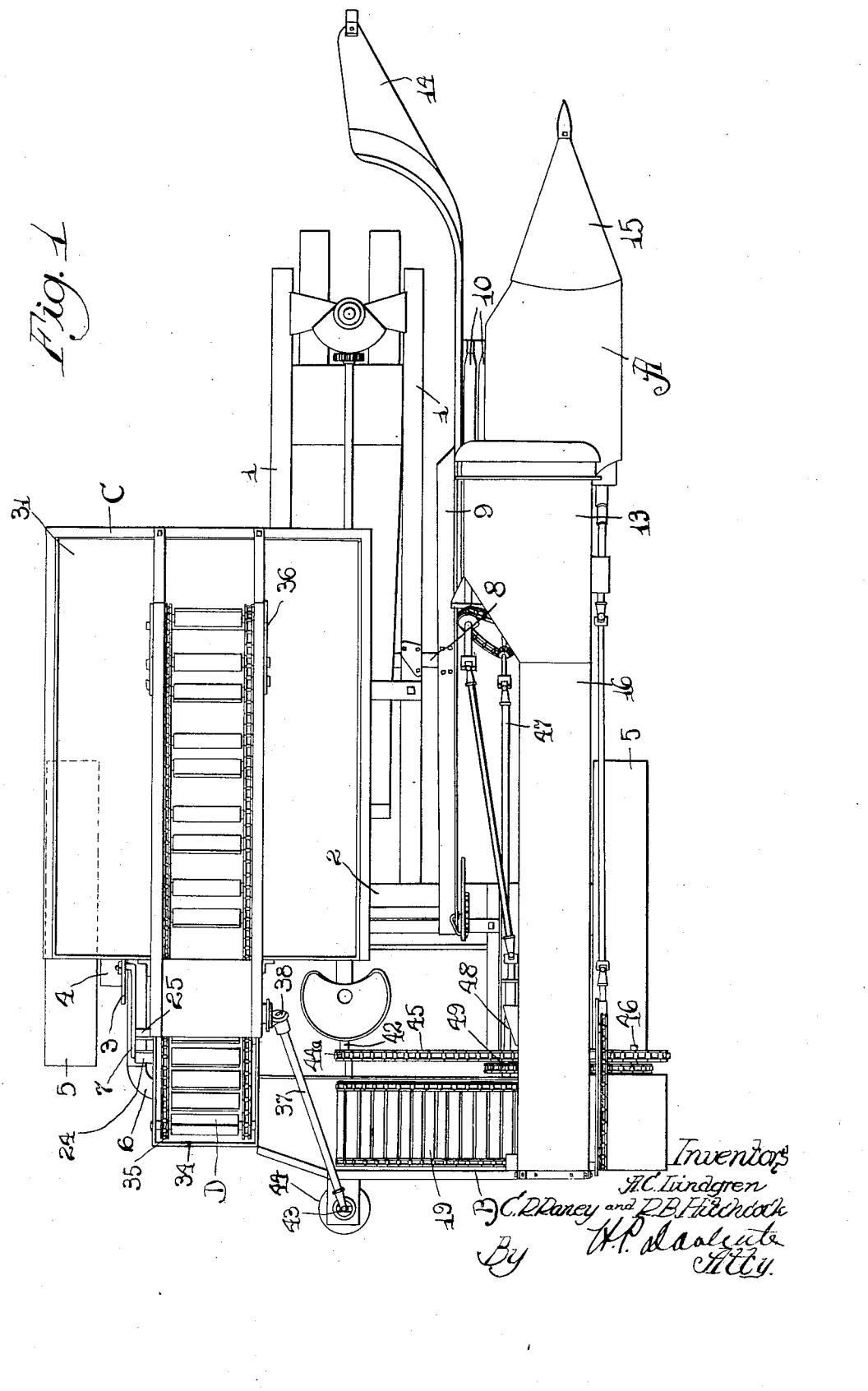

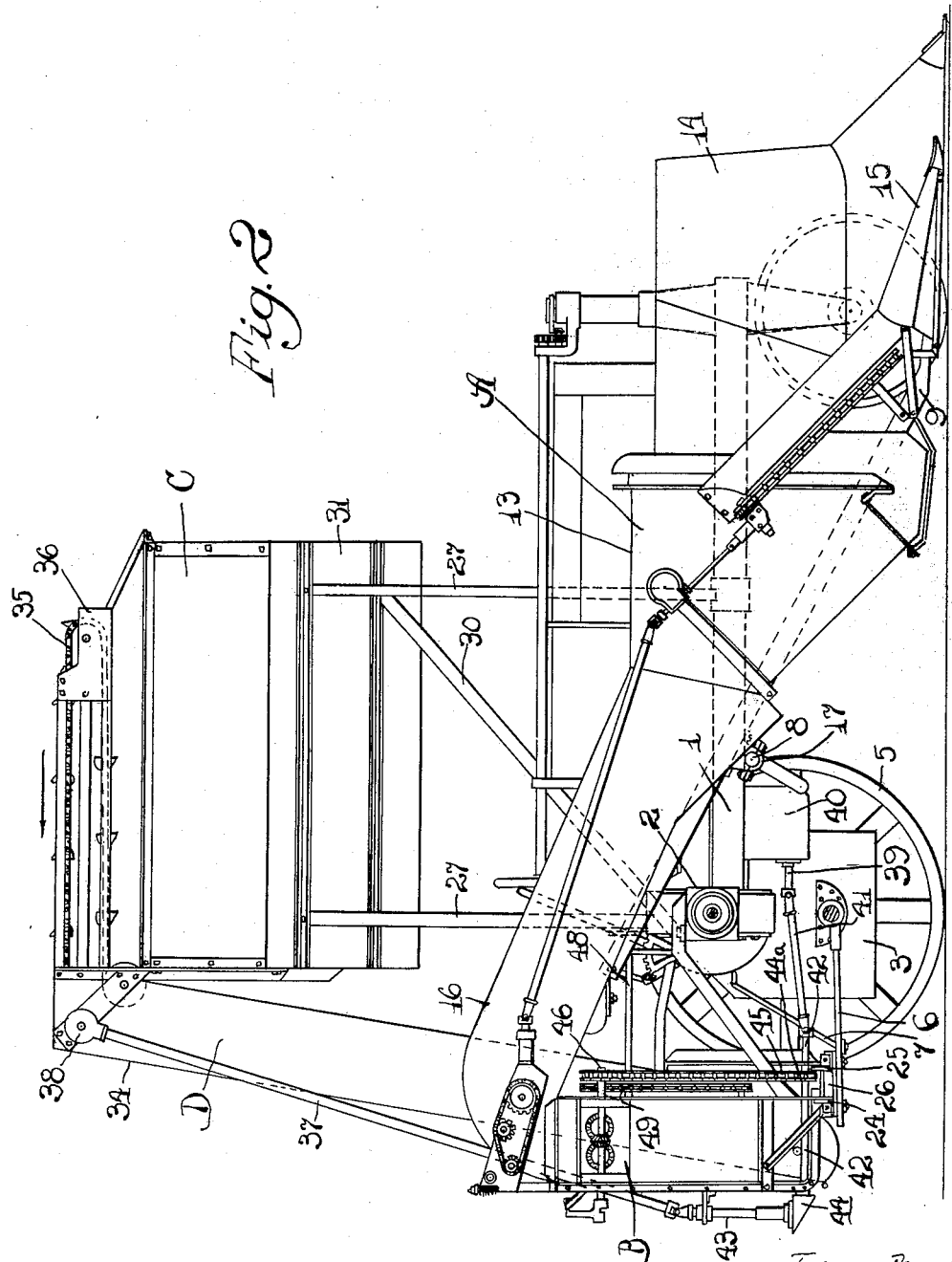

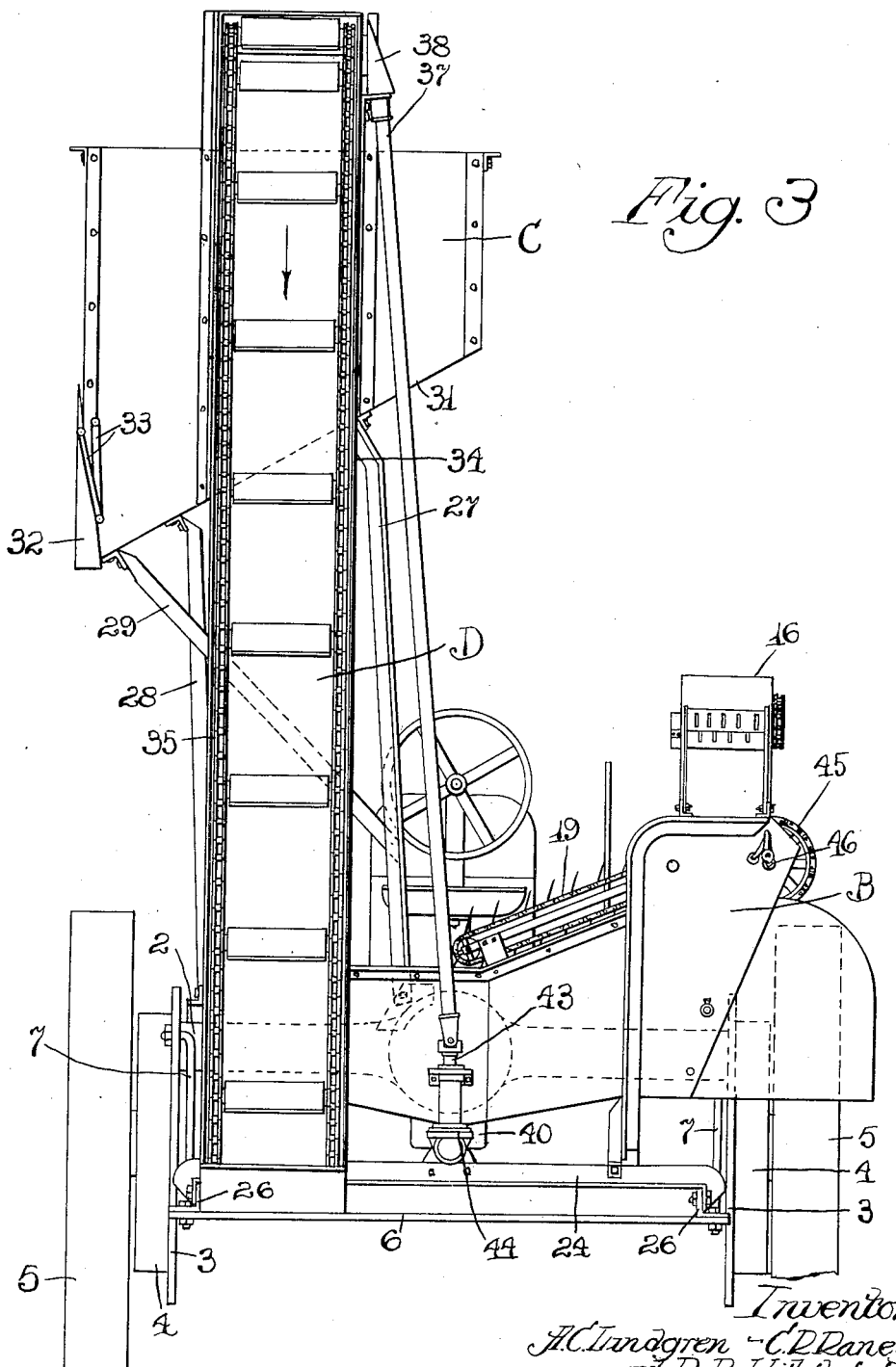

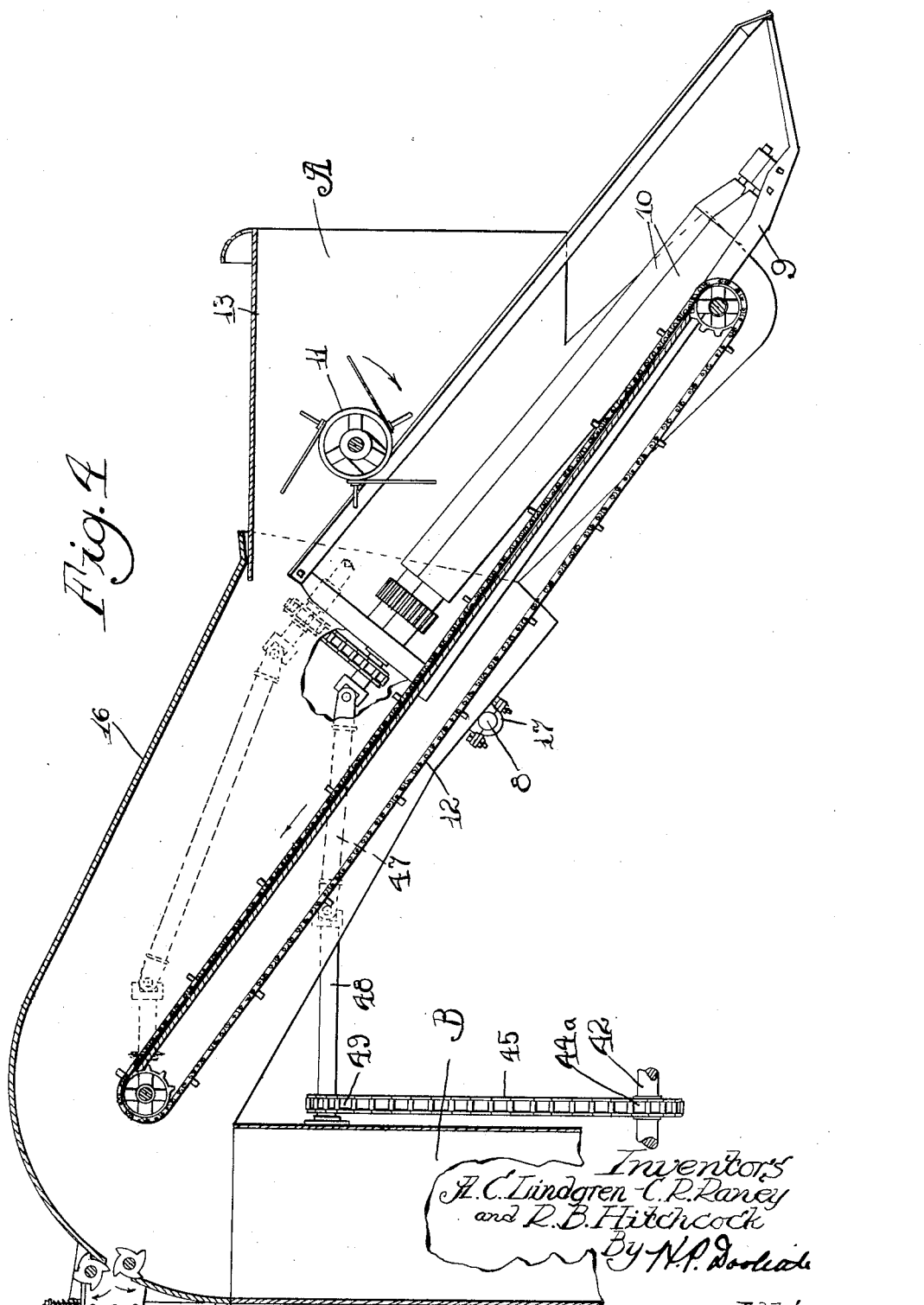

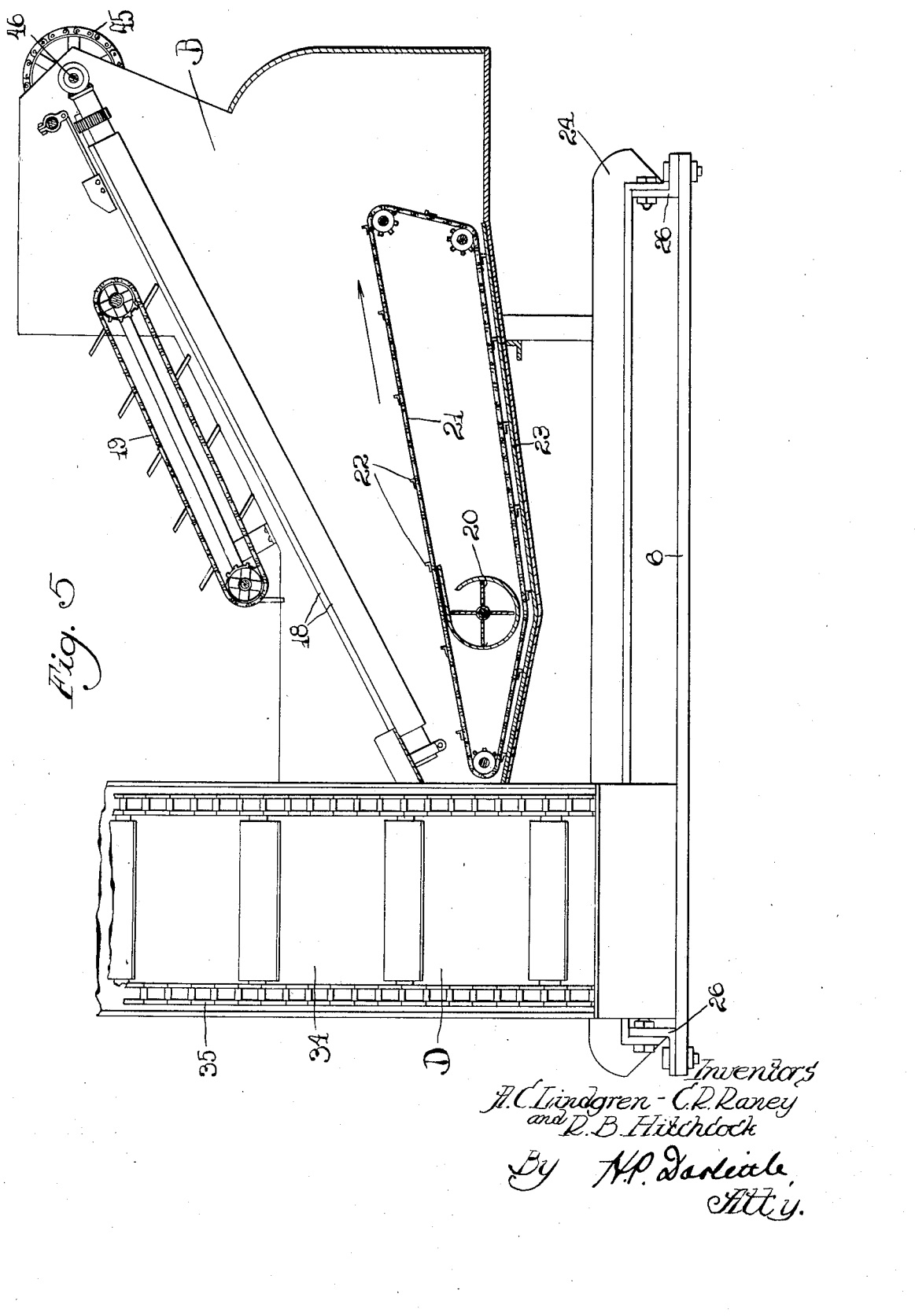

1,952,507

UNITED STATES PATENT OFFICE 1,952,507

TRACTOR CORN PICKER

Alexus C. Lindgren, Chicago, Clemma R. Raney, Riverside, and Rex B. Hitchcock, Chicago, Ill., assignors to International Harvester Company, a corporation of New Jersey Application August 19, 1930, Serial No. 476,256

4 Claims. (Cl. 56—18)

This invention relates to a self-propelled corn picker of the type having the harvesting mechanism mounted on and operated by a tractor.

The principal object of the invention is to provide an improved corn picker assembly in which the units thereof, including a grain receiving tank, are mounted on a tractor in a novel and simplified way.

Another object is to construct, mount, and position the units making up the picker so as to provide a comparatively simple, rigid and compact assembly balanced on a tractor.

Other objects and advantages will be apparent from the detailed description to follow.

The objects of the invention are accomplished by constructing and providing for the operation of a corn picker as illustrated in the drawings, in which:

Figure 1 is a plan view of the picker of the invention and a tractor on which it is mounted;

Figure 2 is a side elevation of the same elements shown in Figure 1;

Figure 3 is a rear view of the same elements shown in Figure 1;

Figure 4 is an enlarged sectional view showing the ear snapping mechanism; and,

Figure 5 is a sectional view showing the husking mechanism.

The corn picker of this invention is shown mounted on a tractor of a well known tricycle type, in which the front wheels are close enough together to be operated between two adjacent rows of corn. The rear wheels have a sufficiently wide tread to operate on the outside of the two rows between which the front wheels operate. The main frame of the tractor has a pair of side channel bars 1 which are secured to a rear axle and differential housing 2. Plates 3 are attached to the ends of the housing 2 and to the housing 4, which enclose gears, not shown, for driving the wheels 5. A U-shaped drawbar 6 is pivotally attached to the inside of the plates 3. The drawbar extends rearwardly from the tractor. Braces 7 secured to the drawbar 6 and to the plates 3 hold the drawbar in rigid position with respect to said plates.

The corn picker as mounted on the tractor may be considered as consisting of several independent units more or less complete within themselves. A side attached gathering and snapping unit A is pivotally mounted on a transversely positioned bar 8 extending under the frame channel bars 1 and rigidly secured thereto. A unit B consisting of the husking mechanism and its associated parts is rigidly mounted at the rear of the tractor, being carried primarily by the drawbar 6. A tank C is mounted above the tractor at the side opposite the snapping unit A on a suitable frame work which will be described hereinafter, and high enough for dumping into a wagon. An elevator D is positioned to receive grain from the husking mechanism and is adapted to deliver it to the tank C. The gathering and snapping unit of this device is of substantially the same construction as shown in detail and covered by claims in the copending application Serial No. 435,728 filed March 14, 1931, now Patent No. 1,906,692, dated February 5, 1933.

Figure 4 shows a cross section through said unit, which comprises a frame structure 9, snapping rolls 10, a beater element 11, a conveyor 12, a hood 13, and means for operating the snapping rolls, the beater element, and conveyor. A gathering arm 14 carried by the frame structure of the snapping unit extends centrally forwardly of the tractor. A similar gathering arm 15 extends forwardly from the picking mechanism. An enclosure 16 formed around the upper portion of the conveyor 12 is pivotally connected to the hood 13. A bracket 17 secured to the frame structure 9 forms a pivotal support for the picker unit on the supporting bar 8. The enclosure 16 terminates above the husking unit, which is shown in Figure 5. Husking rolls 18 of a conventional nature are mounted in the husking unit in a downwardly slanting position. An ear forwarding belt 19 arranged above the husking rolls is adapted to be operated by suitable gearing and chains, not shown in detail. A husked and shelled grain separator of a conventional nature is shown at the bottom of the husking unit. It consists primarily of a fan 20, an endless conveyor 21 having flights 22 and being of a nature such that shelled grain will drop through and be carried into the elevator shaft along the platform 23. The husking mechanism is mounted on a frame structure consisting of angle bars which are shown in part in Figure 2. The frame structure rests on angle bars 24 and 25, which are secured to angle bars 26, as shown in Figure 5. The bars 26 are securely attached to the tractor drawbar 6. The grain tank is mounted on a supporting structure consisting of angle bars 27, 28, 29 and 30. The bars 27 are secured to angle bars forming part of the tank structure and extend substantially vertically downwardly therefrom. The forward bar 27 is secured to the frame 1 of the tractor by a suitable securing means, as shown by dotted lines in Figure 2. The rear bar 27 is secured by a suitable bracket to the rear axle housing 2 of the tractor, as shown in Figures 2 and 3. The diagonally extending bar 29 is secured to the tank structure and to the bar 27 adjacent the lower end thereof. The bar 28 is secured to the tank structure and extends downwardly to the axle housing 2, where it is secured by a bracket, as shown in Figure 3. The bar 30 attached to the tank structure near the forward end thereof, extends diagonally rearwardly and is secured by suitable means to the housing 2. It is to be understood that other bracing bars may be used in a commercial embodiment of the invention, to rigidly secure the tank in position above the tractor. The tank has a bottom 31 slanting downwardly away from the center of the tractor. An end gate type drop door 32 is pivoted to the tank at the bottom. A pair of links 33 regulates the angle to which the door may be opened. The elevator shaft 34 is mounted on the tractor drawbar 6 and extends upwardly to a point above the top of the grain tank C. An endless conveyor 35 is mounted in the elevator shaft 34.

As best shown in Figure 2, the frame structure is mounted above the grain tank to form a leveling device by an extension of the conveyor 35. The roller support 36 at the end of the tank opposite the elevator shaft provides means for extending the conveyor horizontally across the top of the tank. A shaft 37 connected to the picker drive mechanism, as will be hereinafter described, extends upwardly to the top of the elevator shaft to a gear casing 38, shown in Figure 3. Bevel gears in this casing, not shown, are adapted to drive the conveyor.

A power take-off shaft 39 extends from a casing 40 below the tractor frame. By means of universal joints and a shaft 41, connection is made with a shaft 42 extending horizontally beneath the husking unit. All of the operative mechanisms of the picker are driven from this shaft. A shaft 43 mounted in suitable bearing supports at the rear of the husking unit is connected by bevel gears in a casing 44 to the end of the shaft 42. The shaft 43 is connected by a universal joint to shaft 37. A sprocket 44ª on the shaft 42 drives a chain 45 which drives a sprocket on the shaft 46. The shaft 46 drives the husking rolls, as illustrated in Figure 2.

The picker mechanism, as shown in Figure 4, is driven by a shaft 47. The manner in which driving power in transmitted to the various elements of the picking mechanism is described in the copending application previously referred to. The shaft 47 is connected by a universal joint to a shaft 48, which carries a sprocket 49. The sprocket 49 is driven by the chain 45 shown in Figure 2.

In the operation of this device, the tractor is driven with the front wheels between two adjacent rows of corn. The gathering arms 14 and 15 lift the stalks and deliver them in an upright condition to the snapping rolls 10. The ears snapped from the stalks are delivered by the conveyor 12 to the top of the husking rolls 18. The belt 19 assists the action of the husking rolls by pressing the ears thereagainst. The husked ears are delivered to the elevator shaft 34, which delivers the corn to the grain tank. When the end of said tank adjacent the elevator shaft has become filled, the horizontal portion of the elevator conveyor acts as a leveling means to evenly distribute the corn in the tank. The grain which is shelled by the husking rolls falls with the husks on the conveyor 21. The conveyor is operated in the direction of the arrows, as shown in Figure 5. The husks are carried along by the conveyor 21 together with the action of the fan 20 and are discharged from the husking unit. The shelled grain falls on the platform 23 and is delivered into the bottom of the elevator shaft by the flights 22 on the conveyor 21.

It will be understood that in the description of the various units of the corn picker of this invention only sufficient of said elements are described in detail to show clearly the general construction of the units and their mode of operation. In general, as pointed out, the invention consists of pivotally mounting a gathering and snapping unit at one side of a tractor, a husking unit at the rear of the tractor, and a grain receiving tank at the side of the tractor opposite the gathering mechanism. By mounting the units in this manner, the weight of the units on the tractor is substantially balanced, and side draft is substantially eliminated.

It is to be understood that the drawings illustrate a preferred form in which the invention may be embodied and that the picker is shown mounted on a tractor for which it is particularly adapted. It is the intention to cover all embodiments of the invention covered by the appended claims.

What is claimed is:

1. A tractor mounted corn picker comprising a tractor having a narrow body, a front rolling support of a width not greater than the width of the tractor body adapted to operate between two adjacent rows of corn, an extended rear axle structure, and wide tread rear wheels mounted at the ends of said axle structure adapted to operate on the outside of adjacent rows, a picker unit mounted at one side of the tractor occupying laterally the space between the tractor body and the rear wheel, a tank mounted on the tractor at the side opposite the picker unit, its outer side terminating laterally substantially with the outside of the rear wheel at that side, and means for delivering corn from the picker unit to the tank.

2. A tractor mounted corn picker comprising a tractor having a narrow body, a front rolling support of a width not greater than the width of the tractor body adapted to operate between two adjacent rows of corn, an extended rear axle structure, and wide tread rear wheels mounted at the ends of said axle structure adapted to operate on the outside of adjacent rows, a picker unit mounted at one side of the tractor occupying laterally the space between the tractor body and the tread line of the rear wheel, a tank mounted on the tractor at the side opposite the picker unit positioned relative to the center line of the tractor in a balancing location with respect to the picker unit, and means for delivering corn from the picker unit to the tank.

3. A tractor mounted corn picker comprising a tractor having a narrow body, a front rolling support of a width not greater than the width of the tractor body adapted to operate between two adjacent rows of corn, an extended rear axle structure, and wide tread rear wheels mounted at the ends of said axle structure adapted to operate on the outside of adjacent rows, a picker unit mounted at one side of the tractor, a tank mounted on the tractor at the side opposite the picker unit, said picker unit and said tank lying substantially within the space bounded by vertical longitudinal planes passing through the outside edge of the tractor wheels, the means for delivering corn from the picker unit to the tank.

4. A tractor mounted corn picker comprising a tractor having a narrow body, a front rolling support of a width not greater than the width of the tractor body and adapted to operate between two rows of corn, an extended rear axle structure and wide tread rear wheels mounted at the ends of the axle structure and adapted to operate on the outside of the adjacent rows between which the front rolling support operates, a picker unit mounted at one side of the tractor latterally between the body thereof and a vertical plane passing through the outer edge of one of the rear wheels, a grain tank mounted on the other side of the tractor body extending laterally therefrom and terminating substantially in a vertical plane passing through the outer edge of the wheel at that side, and means for conveying corn from the picker to said tank.

ALEXUS C. LINDGREN.
CLEMMA R. RANEY.
REX B. HITCHCOCK.